United States Patent
Ito et al.

(10) Patent No.: US 6,414,942 B1
(45) Date of Patent: Jul. 2, 2002

(54) TRAFFIC GENERATOR AND METHOD OF DETERMINING A TRAFFIC GENERATING FUNCTION

(75) Inventors: Yoshihiro Ito, Saitama; Masami Ishikura, Tokyo; Tooru Asami, Saitama, all of (JP)

(73) Assignee: Kokusai Denshin Denwa Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/128,212

(22) Filed: Aug. 3, 1998

(30) Foreign Application Priority Data

Aug. 12, 1997 (JP) .............................. 9-230449

(51) Int. Cl.[7] .......................... H04L 12/26; H04L 12/56
(52) U.S. Cl. ......................... 370/250; 370/252; 370/389
(58) Field of Search ................................. 370/230, 235, 370/241, 250, 252, 253, 389, 468, 470; 709/220, 223, 224

(56) References Cited

U.S. PATENT DOCUMENTS

| 4,792,753 A | * | 12/1988 | Iwai | 370/94 |
|---|---|---|---|---|
| 4,916,694 A | * | 4/1990 | Roth | 370/94 |
| 5,128,932 A | * | 7/1992 | Li | 370/60 |
| 5,602,845 A | * | 2/1997 | Wahl | 370/395 |
| 5,706,436 A | * | 1/1998 | Lewis et al. | 395/200.11 |
| 5,859,853 A | * | 1/1999 | Carlson | 370/468 |
| 6,028,847 A | * | 2/2000 | Beanland | 370/252 |

* cited by examiner

*Primary Examiner*—Alpus H. Hsu
(74) *Attorney, Agent, or Firm*—Westman, Champlin & Kelly, P.A.

(57) ABSTRACT

A traffic generator for sending a pseudo-traffic onto a packet-switched network to evaluate the network performance and a traffic generating function determining method of optimizing generating functions (mathematical models) for a pseudo-traffic are provided. A traffic analysis unit 71 analyzes an actual traffic inputted thereto. An evaluate/optimization unit 74*a* optimizes parameters of first mathematical models on the basis of a packet length extracted by a packet length extracted unit 71*a* and the calculation results of the first mathematical models stored in a mathematical model storing unit 72*a*. The optimized first mathematical model is then registered in a packet length determining unit 2*a* of a packet sending pattern determining module 2. The packet length determining unit 2*a* calculates the packet length on the basis of the first mathematical model thus registered and then outputs the calculation result to a packet generating module.

6 Claims, 7 Drawing Sheets

TRAFFIC GENERATOR AND METHOD OF DETERMINING A TRAFFIC GENERATING FUNCTION

BACKGROUND OF THE INVENTION

1. Field of the Invention

The present invention relates in general to a traffic generator for evaluating communication characteristics and a method of determining a traffic generating function, and more particularly to a traffic generator for sending a pseudo-traffic to a packet-switched network to evaluate the network performance and a traffic generating function determining method of optimizing generating functions (mathematical models) for a pseudo-traffic.

2. Description of the Related Art

In recent years, the introduction of a network system has progressed, and hence various kinds of applications are operated through the network. Since the scale of the system has been increased and complicated more and more, the application may not be operated as expected and may not be sufficiently confirmed in some cases. For this reason, there has been increased the necessity of evaluating whether or not the resources are effectively utilized.

In general, when carrying out the design and analysis of the network, it is the most effective method to transmit the traffic which is actually sent onto the network by the applications (hereinafter, it may also be referred to as "an actual traffic" in some cases) through the network as an object of evaluation and the network equipments in order to measure and analyze the traffic.

However, it is difficult in terms of cost to get previously a complete set of necessary applications in order to carry out the evaluation tests. If the actual traffic is employed therefor which is generated by the actual application, then it will be difficult in many cases to carry out the quantitative analysis. For this reason, conventionally, there has been employed a traffic generator for generating a pseudo-traffic which is obtained by imitating the traffic generated by an arbitrary application.

In the case where the packet-switched network becomes an object of evaluation, the characteristics of the traffic which is sent through the various kinds of applications are determined on the basis of both of the packet length and the packet interval. In the conventional traffic generator, since the packet length and the packet interval of the pseudo-traffic are fixed to predetermined values, respectively, it is impossible to generate the pseudo-traffic which is suitable for each of the applications.

SUMMARY OF THE INVENTION

The object of the invention is to provide a traffic generator which is capable of setting dynamically both of a packet length and a packet interval of a pseudo-traffic by utilizing a generating function, and a method of determining a traffic generating function.

In order to attain the above-mentioned object, the present invention may provide taking the following measures.

(1) In a traffic generator for sending a pseudo-traffic to a packet-switched network, there are provided: packet length determining means for determining dynamically a packet length of a pseudo-traffic; packet interval determining means for determining dynamically a packet interval of a pseudo-traffic; and pseudo-traffic sending means for generating the pseudo-traffic having both of the packet length and the packet interval thus determined to send the pseudo-traffic onto a network.

According to the traffic generator configured as described above, since both of the packet length and the packet interval of the pseudo-traffic can be arbitrarily set, it is possible to send the pseudo-traffic corresponding to the application as an object of evaluation.

(2) In a traffic generating function determining method of optimizing parameters of mathematical models of a pseudo-traffic, there are provided the steps of: optimizing parameters of first mathematical models on the basis of both of the calculation results of the first mathematical models us ed to define a packet length of the pseudo-traffic and a packet length of an actual traffic generated by an application as an object of evaluation; optimizing parameters of second mathematical models on the basis of the calculation results of the second mathematical models used to define a packet interval of the pseudo-traffic and a packet interval of an actual traffic generated by the application as an object of evaluation; and determining both of the packet length and the packet interval of the pseudo-traffic to be sent on the basis of the first and second mathematical models thus optimized.

According to the traffic generating function determining method designed as described above, since the highly accurate mathematical models can be obtained which are capable of reproducing with accuracy both of the packet length and the packet interval of the actual traffic, respectively, it is possible to generate the pseudo-traffic having both of the packet length and the packet interval which are close to those of the actual traffic, respectively.

DETAILED DESCRIPTION OF THE PREFERRED EMBODIMENTS

Figure 1:
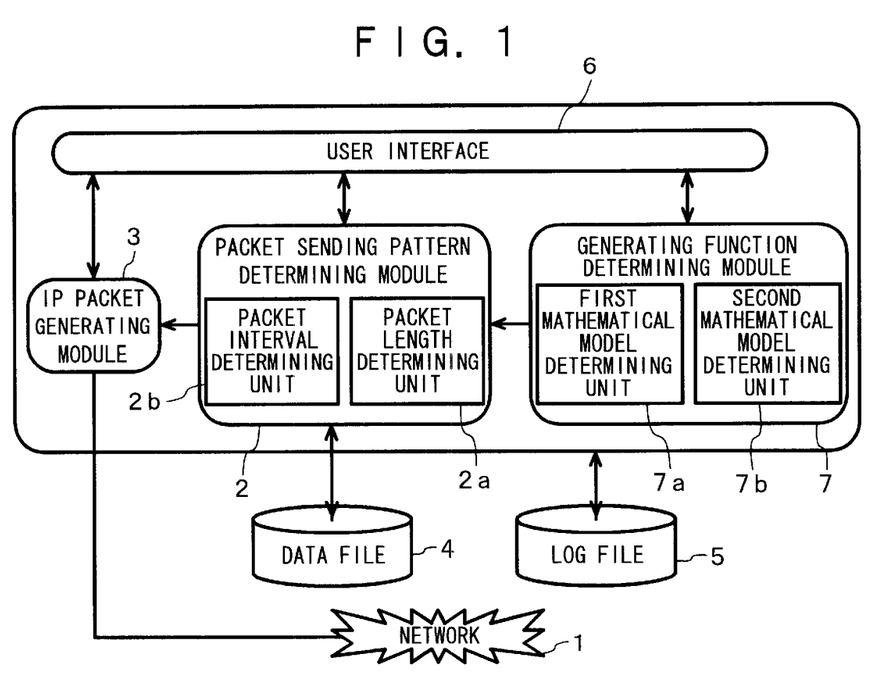
FIG. 1 is a block diagram showing a configuration of a main portion of a traffic generator to which the present invention is applied.
Figure 2:
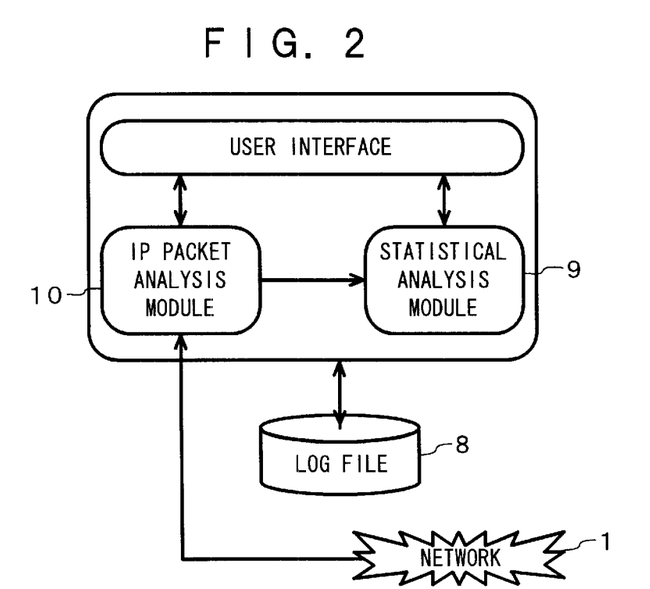
FIG. 2 is a block diagram showing a configuration of a main portion of a traffic analyzer.

The preferred embodiments of the present invention will hereinafter be described in detail with reference to the accompanying drawings. FIG. 1 is a block diagram showing a configuration of a main portion of a traffic generator as an embodiment of the present invention, and FIG. 2 is a block diagram showing a configuration of a main portion of a traffic analyzer.

In FIG. 1, a module 2 for determining a packet sending pattern includes, a packet length determining unit 2a for determining, with respect to a pseudo-traffic which is sent onto a network 1 in order to carry out either the network evaluation or the application evaluation, a packet length thereof dynamically, successively, and a packet interval determining unit 2b for determining dynamically, successively a packet interval thereof.

The packet length determining unit 2a calculates a packet length on the basis of an approximate function (a first mathematical model which has been optimized in parameters) of packet length distribution and then outputs the calculation result as the packet length data of the pseudo-traffic to an IP packet generating module 3. The packet interval determining unit 2b calculates a packet interval on the basis of an approximate function (a second mathematical model which has been optimized in parameters) of packet interval distribution and then outputs the calculation result as the packet interval data of the pseudo-traffic to the IP packet generating module 3.

A generating function determining module 7 includes, but is not limited to, a first mathematical model determining unit 7a for determining the first mathematical model as the approximate function of the packet length distribution and the optimal parameters thereof, and a second mathematical model determining unit 7b for a determining the second mathematical model as the approximate function of the packet interval distribution and the optimal parameters thereof. In this connection, the description will be given later in detail with respect to the configuration and the operation of the generating function determining module 7 with reference to a functional block diagram and a flow chart.

In a data file 4, there is previously stored the data relating to both of the packet length and the packet interval of the actual traffic which is sent by the application as an object of the evaluation. The packet sending pattern determining module 2 can also carry out, in a addition to the operations of calculating the packet length and the packet interval which operations are carried out by the packet length determining unit 2a and the packet interval determining unit 2b, respectively, the operation of reading out both of the packet length data and the packet interval data which are previously stored in the data file 4 to send these data to the IP packet generating module 3.

The IP packet generating module 3 generates a pseudo-traffic on the basis of both of the packet length data and the packet interval data which have been respectively calculated by the packet length determining unit 2a and the packet interval determining unit 2b of the packet sending pattern determining module 2, or both of the packet length data and the packet interval data which have been read out from the data file 4 through the packet sending pattern determining module 2, and then outputs the pseudo-traffic thus generated onto the network 1. In a log file 5, there is stored the characteristic data of the pseudo-traffic which has been sent from the IP packet generating module 3 onto the network 1.

Referring now to FIG. 2, an IP packet analysis module 10 reads out the necessary information from the pseudo-traffic which has been received through the network 1 and then transfers the data relating to the time when receiving the packets, the number of received packets and the number of received bytes to each of a statistical analysis module 9 and a log file 8. Then, the statistical analysis module 9 analyzes the throughput, the packet loss rate and the like on the basis of the analysis information which has been transferred thereto from the IP packet analysis module 10.

Figure 3:
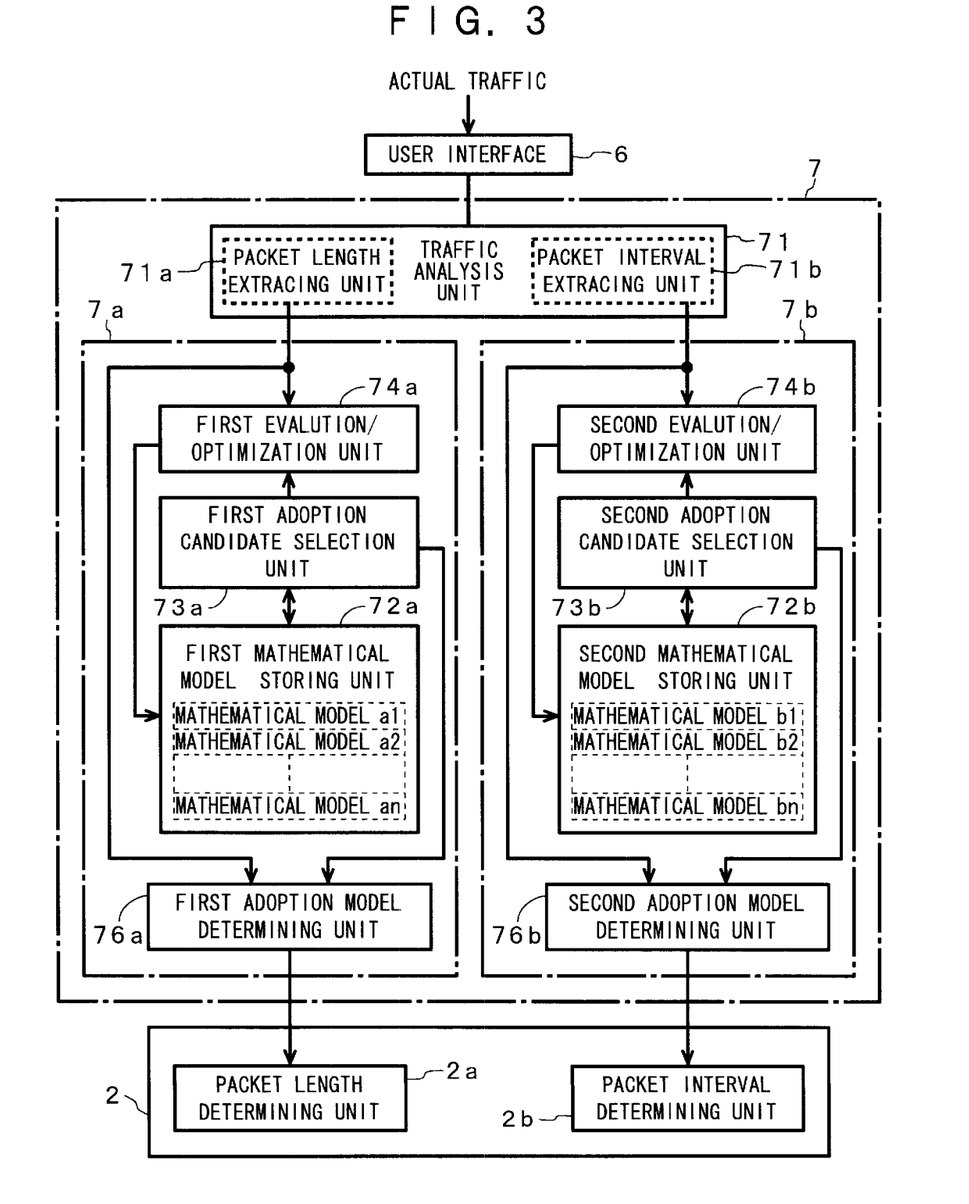
FIG. 3 is a functional block diagram showing a configuration of one embodiment of a generating function determining module.

FIG. 3 is a functional block diagram showing a configuration of the generating function determining module 7 as one constituent element of the traffic generator. In the figure, the same reference numerals as those of FIG. 1 represent the same or corresponding parts as those of FIG. 1.

A traffic analysis unit 71 analyzes the actual traffic which has been generated by the application as an object of evaluation. That is, when the actual traffic is inputted through a user interface 6, a packet length extracting unit 71a extracts the data relating to the packet length of the actual traffic to output the data relating to the packet length thus extracted to a first evaluation/optimization unit 74a. A packet interval extracting unit 71b extracts the data relating to the packet interval of the actual traffic to output the data relating to the packet interval thus extracted to a second evaluation/optimization unit 74b.

In a first mathematical model storing unit 72a, there are stored a plurality of first mathematical models (mathematical models a1 to an) which are used to define the packet length distribution of the pseudo-traffic. A first adoption candidate selecting unit 73a reads out successively the first mathematical models becoming the candidates from the first mathematical model storing unit 72a to transfer the first mathematical models thus read out to the first evaluation/optimization unit 74a.

Then, the first evaluation/optimization unit 74a optimizes, on the basis of both of the packet length the data of which has been extracted by the packet length extracting unit 71a and the calculation results of the first mathematical models which have been successively selected, the parameters of the selected first mathematical models a1 to an, respectively. A first adoption model determining unit 76a selects, on the basis of the adaptation errors between the optimized first mathematical models a1 to an and the actual traffic, the optimal first mathematical model to register the optimal first mathematical model thus selected in the packet length determining unit 2a of the packet sending pattern determining module 2. Then, the packet length determining unit 2a calculates the packet length on the basis of the first mathematical model thus registered, and then outputs the calculation result as the packet length data of the pseudo-traffic to the packet generating module 3.

Likewise, in a second mathematical model storing unit 72b, there are stored a plurality of second mathematical models (mathematical models b1 to bn) which are used to define the packet interval distribution of the pseudo-traffic. A second adoption candidate selecting unit 73b reads out successively the second mathematical models becoming the candidates from the mathematical model storing unit 72b to transfer the second mathematical models thus read out to the second evaluation/optimization unit 74b.

Then, the second evaluation/optimization unit 74b optimizes, on the basis of both of the packet interval the data of which has been extracted by the packet interval extracting unit 71b and the calculation result of the second mathematical models which have been successively selected, the parameters of the selected second mathematical models, respectively. A second adoption model determining unit 76b selects, on the basis of the adaptation errors between the optimized second mathematical models b1 to bn and the actual traffic, the optimal second mathematical model to register the optimal second mathematical model thus selected in the packet interval determining unit 2b of the packet sending pattern determining module 2. Then, the packet interval determining unit 2b calculates the packet interval on the basis of the second mathematical model thus registered and then outputs the calculation result as the packet interval data of the pseudo-traffic to the packet generating module 3.

Figure 4:
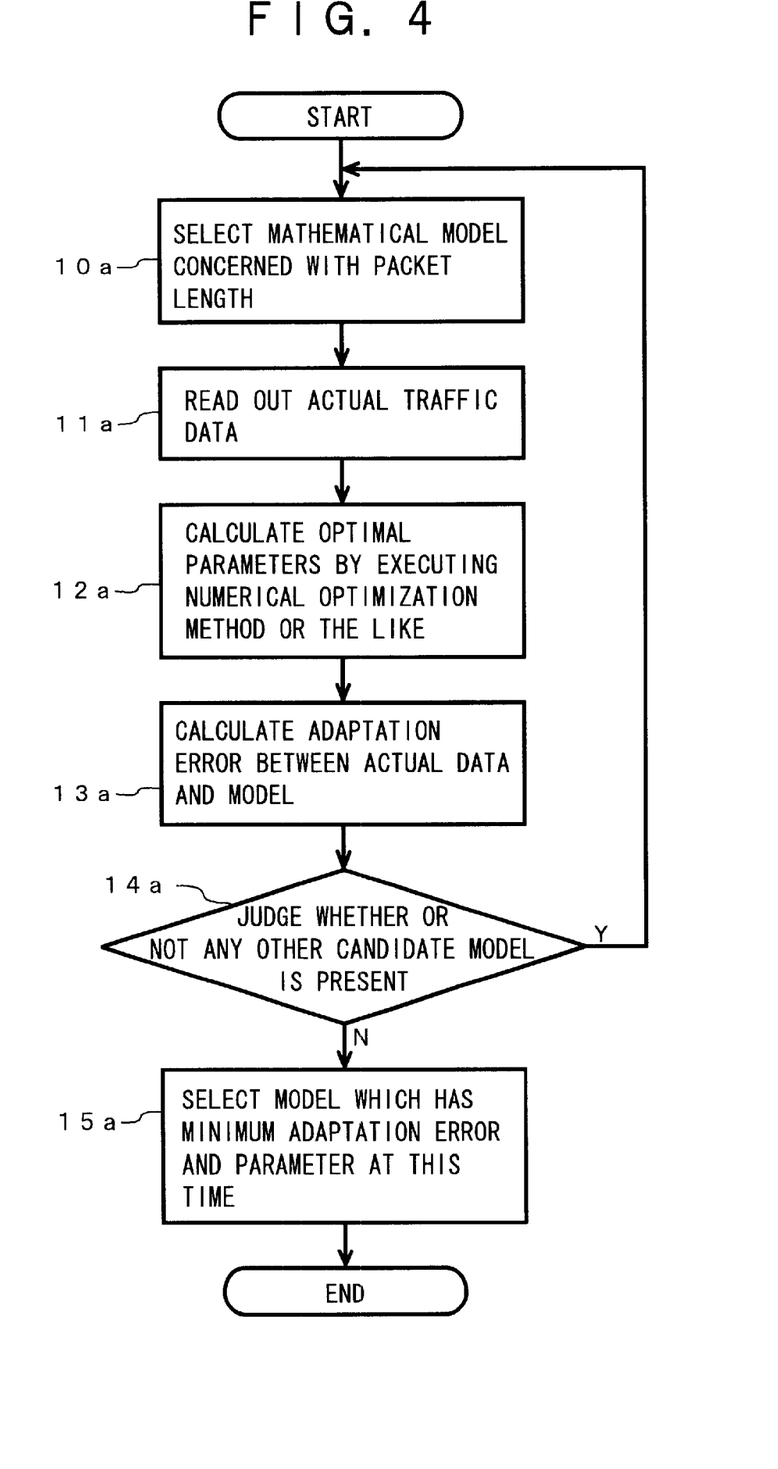
FIG. 4 is a flow chart useful in explaining a method of optimizing first mathematical models by which the packet length distribution is approximated.

Referring to the flow chart of FIG. 4, the description will hereinbelow be given with respect to a method of determining the mathematical model concerned with the packet length, i.e., the operation of the first mathematical model determining unit 7a including therein the first mathematical model storing unit 72a, the first adoption candidate selecting unit 73a, the first evaluation/optimization unit 74a and the first adoption model determining unit 76a shown in the functional block diagram which has been described with reference to FIG. 3.

Figure 5:
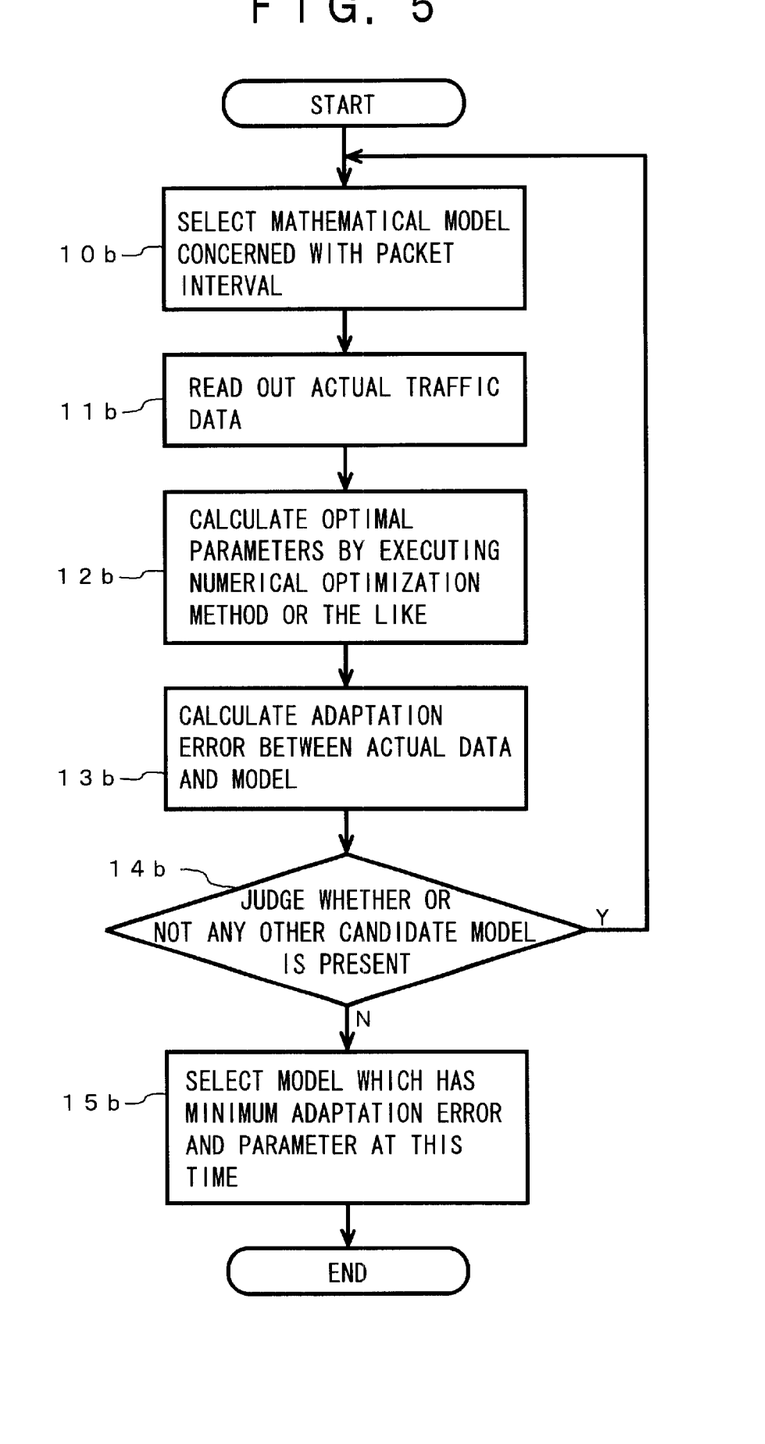
FIG. 5 is a flow chart useful in explaining a method of optimizing second mathematical models by which the packet interval distribution is approximated.

A flow chart of FIG. 5 shows the operation of the second mathematical model determining unit 7b for determining the mathematical model concerned with the packet interval. In this connection, the operation of the second mathematical model determining unit 7b is substantially the same as that shown in FIG. 4, and hence the description thereof is omitted here for the sake of simplicity.

In Step S10a, at the start, the mathematical model a1 is selected from the first mathematical model storing unit 72a, in which a plurality of first mathematical models a1 to an concerned with the packet length are stored, by the first adoption candidate selecting unit 73a. In Step S11a, the packet length of the actual traffic the data of which is inputted through the user interface 6 is extracted by the packet length extracting unit 71a of the traffic analysis unit 71. In Step S12a, on the basis of the packet length thus extracted and the calculation result of the selected mathematical model a1, the first evaluation/optimization unit 74a calculates the optimal parameters of the mathematical model a1.

The calculation of the optimal parameters can be considered to be the minimization problem of the multivariable function which is defined as similarity between the extracted actual packet length and the calculation result of the mathematical model a1, and hence it can be obtained by executing the multivariable function minimization algorithm such as the polytope method for example. In addition, it can also be obtained by executing the numerical optimization such as the simplex method.

In Step S13a, there is calculated the adaptation error between the calculation result of the mathematical model a1 which has been optimized in parameters and the actual packet length. In Step S14a, it is judged whether or not any other first mathematical model is present. In the present embodiment, since other mathematical models a2 to an are present, the processing is returned back to Step S10a in which at the next time, the mathematical model a2 is selected in turn by the first adoption candidate selecting unit 73a to be optimized in parameters in the similar manner to that in Step S12a, and then the adaptation error between the calculation result of the mathematical model a2 which has been optimized in parameters and the actual packet length is calculated.

After the adaptation errors with respect to all of the registered first mathematical models a1 to an have been calculated, in Step S15a, the mathematical model which has the minimum adaptation error and the optimal parameters thereof is selected by the first adoption model determining unit 76a and then the packet length determining unit 2a is informed of the mathematical model and the optimal parameters thereof thus selected.

According to the present embodiment, since the highly accurate mathematical model can be obtained which is capable of reproducing with accuracy both of the packet length and the packet interval of the actual traffic, it is possible to generate the pseudo-traffic which is close to the actual traffic. In addition, since both of the packet length and the packet interval of the pseudo-traffic can be arbitrarily set, it is possible to send the pseudo-traffic corresponding to the application as an object of evaluation.

Figure 6:
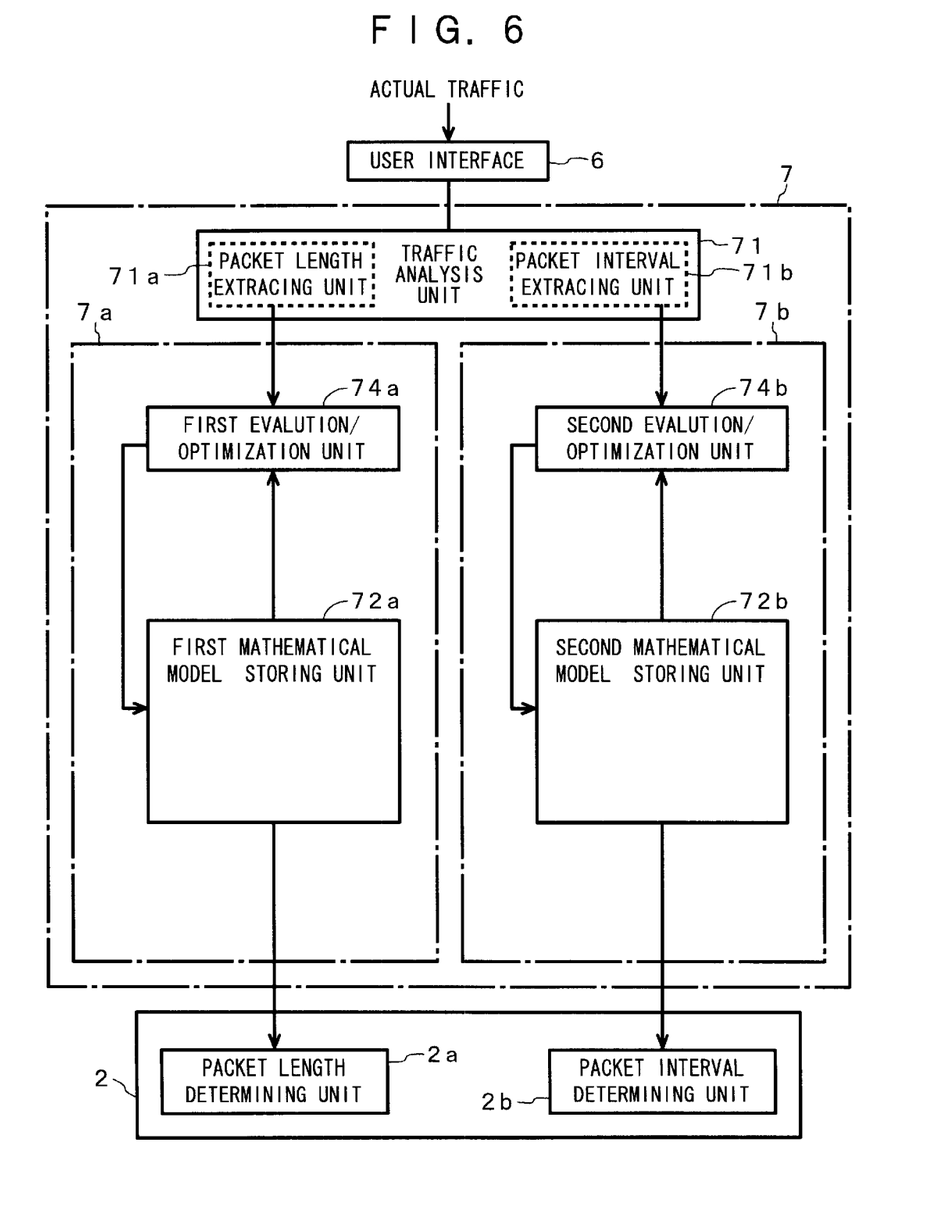
FIG. 6 is a functional block diagram showing a configuration of another embodiment of a generating function determining module.

FIG. 6 is a functional block diagram showing a configuration of another embodiment of the generating function determining module 7 as one constituent element of the traffic generator. In the figure, the same reference numerals as those of FIGS. 1 and 3 represent the same or corresponding parts as those of FIGS. 1 and 3.

In the above-mentioned first embodiment, there are prepared a plurality of first mathematical models which are used to determine the packet length and a plurality of second mathematical models which are used to determine the packet interval. Then, after having optimized all of the mathematical models, the adaptation errors are compared with one another to determine the optimal mathematical model. If the optimal mathematical model is made clear, then as in a second embodiment which will hereinbelow be described, the procedure may also be adopted such that two mathematical models are prepared so as to have one-to-one correspondence to the packet length and the packet interval and then the two mathematical models have only to be optimized, respectively.

In FIG. 6, the traffic analysis unit 71 analyzes the actual traffic which has been generated by the application as an object of evaluation. In the first mathematical model storing unit 72a, there is stored only the first mathematical model a1 which is used to define the packet length distribution of the pseudo-traffic. The first evaluation/optimization unit 74a optimizes the parameters of the first mathematical model on the basis of both of the packet length the data of which has been extracted by the packet length extracting unit 71a and the calculation result of the first mathematical model which is stored in the first mathematical model storing unit 72a.

The optimized first mathematical model is then registered in the packet length determining unit 2a of the packet sending pattern determining module 2. Then, the packet length determining unit 2a calculates the packet length on the basis of the first mathematical model thus registered, and then outputs the calculation result as the packet length data of the pseudo-traffic to the packet generating module 3.

On the other hand, in the second mathematical model storing unit 72b, there is stored only the second mathematical model b1 which is used to define the packet interval distribution of the pseudo-traffic. The second evaluation/optimization unit 74b optimizes the parameters of the second mathematical model on the basis of both of the packet interval the data of which has been extracted by the packet interval extracting unit 71b and the calculation result of the second mathematical model which is stored in the second mathematical model storing unit 72b.

The optimized second mathematical model is then registered in the packet interval determining unit 2b of the packet sending pattern determining module 2. Then, the packet interval determining unit 2b calculates the packet interval on the basis of the second mathematical model thus registered and then outputs the calculation result as the packet interval data of the pseudo-traffic to the packet generating module 3.

Figure 9:
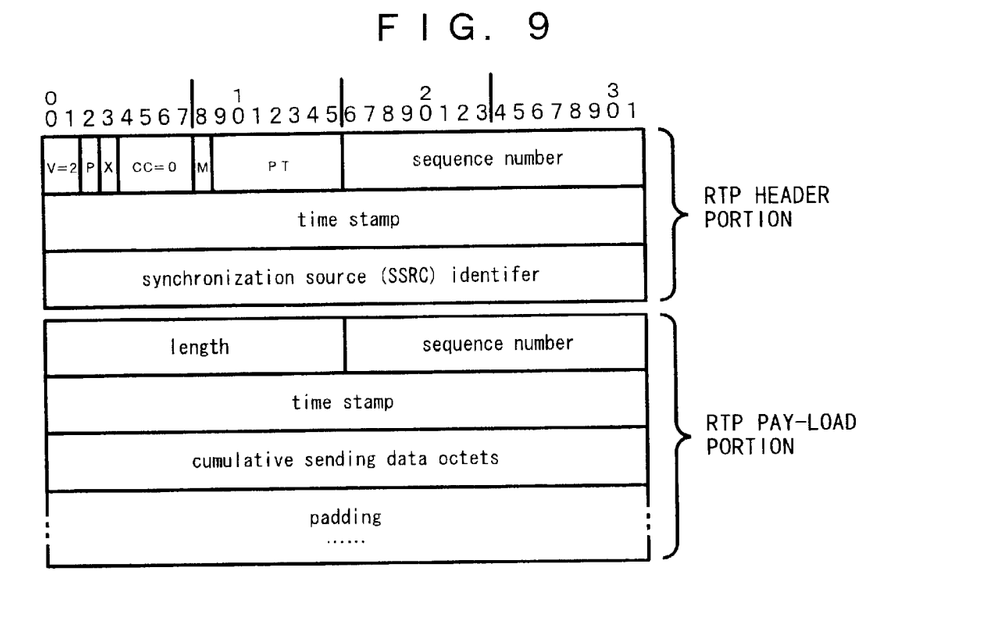
FIG. 9 is a schematic diagram useful in explaining a format of a pseudo-packet protocol.

FIG. 9 is a schematic diagram showing a format of the pseudo-traffic packet. In the present embodiment, the format of the packet for the pseudo-traffic is constructed in conformity to the RTP so that coping with the LAN analyzer and the interconnection with other systems can be made easy.

The first 12 bytes of the packet correspond to the header of the RTP, and in the first 12 bytes of the pay-load portion right thereafter, the information which is employed in the present invention is stored. The structure of the RTP header portion is as follows.

[Version (V)]

"2" is registered as the version number of the RTP in the present embodiment.

[Padding (P)] and [Extension (X)]

In the present embodiment, since the padding and the extension other than the pay-load are not carried out, "0" is registered.

[CSRC count (CC)]

In the present embodiment, since only one transmission source is assumed to be present over one session and hence the CSRC is absent, "0" is registered.

[Marker (M)]

"1" is registered in the case where the packet contains the delimiter information, while "0" is registered in any other case other than that case.

[Payload Type (PT)]

It represents the kind of delimiter when the packet has the information as the delimiter.

"0" is registered when Marker is "0".

[Sequence Number]

It is the sequence number which is given to the packet. While in the present embodiment, the sequence number of 4 bytes length is used, in the RTP packet, there is not only the field for 2 bytes and hence the lower 2 bytes of the sequence number are registered.

[Time Stamp]

While the data relating to the time (the date and time, and seconds) when the packet was generated is registered, in the RTP packet, the time stamp field has 4 bytes length and hence it is impossible to describe the data relating to the time from the date and time, and seconds to microseconds. Since in the present embodiment, the time from the date and time to microseconds is used, only the values of the date and time, and seconds are registered therein.

[SSRC (Synchronization Source)]

In the present embodiment, only one transmission source is present over one session, and hence the fixed value "0" is registered.

In the pay-load portion, the structure thereof is as follows.

[Length]

the data relating to the padding length (the size of the packet except for the header) is registered.

[Sequence Number]

The upper 2 bytes of the sequence number which is used in the present embodiment are registered.

[Time Stamp]

The data relating to the contents of microseconds of the time when the packet is generated is registered.

[Cumulative Sending Data Octets]

The cumulative data bytes which have been transmitted till that time are registered to be used in the statistical analysis on the reception side.

Next, the description will hereinbelow be given with respect to an example of practical use in which the pseudo-traffic is generated using the present system. There are shown here the pseudo-traffic characteristics which are obtained when emulating the traffic characteristics of the NV (Network Video: manufactured by Xerox Co. LTD.), which is one of the desk-top conference system applications, on the basis of the mathematical model of the pseudo-traffic which is selected and optimized by executing the above-mentioned method.

The traffic which the NV generates has, as the characteristics, both of the variable packet length and the variable packet interval. The mathematical models which are adopted as the distribution function of the variable packet length and the variable packet interval are expressed by the following expressions (1), (2) and (3), (4), respectively.

$$p(s)=0$$

In this connection, the relation of S<Smin and S>Smax is established.

$$p(s) = \frac{(S_{ave} - S_{min}))^{\frac{s-s_{min}}{a \cdot u}}}{\frac{s-s_{min}}{a \cdot u}!} e - (S_{ave} - S_{min})$$

In this connection, the relation of Smax≧S≧Smin is established.

In expressions (1) and (2), Save is the mean packet length, Smin is the minimum packet length, Smax is the maximum packet length, p(s) is the generation probability when the packet length is s, a is the correction factor of distribution, and u is the generation unit of the packet. In the case of the fixed length packet, p(s) is sometimes 1 and is otherwise 0.

$$pi(g) = \frac{b_i}{a} \cdot \frac{g_i^{\frac{g}{a \cdot u}}}{\frac{g}{a \cdot u}!} e^{-g_i}$$

where the relation of g≧0 is established.

$$p(g)=\Sigma p_i(g)$$

where i=1, 2, 3, . . . , n.

In expressions (3) and (4), p(g) is the generation probability when the packet interval is g, gi is the mean packet interval of each of the characteristics, and Σ bi is the weighting factor ( bi=1)

When the parameters of the mathematical models have been optimized on the basis of the actual traffic of the NV, the following values are obtained for the parameters.

Save=1100
Smin=1050
Smax=1500
a=1
u=10

With respect to the packet interval, it is assumed that there is one characteristic (n=1). Then, the following values are obtained for the parameters.

b=1
g=0.0025
a=1
u0.001

Figure 7:
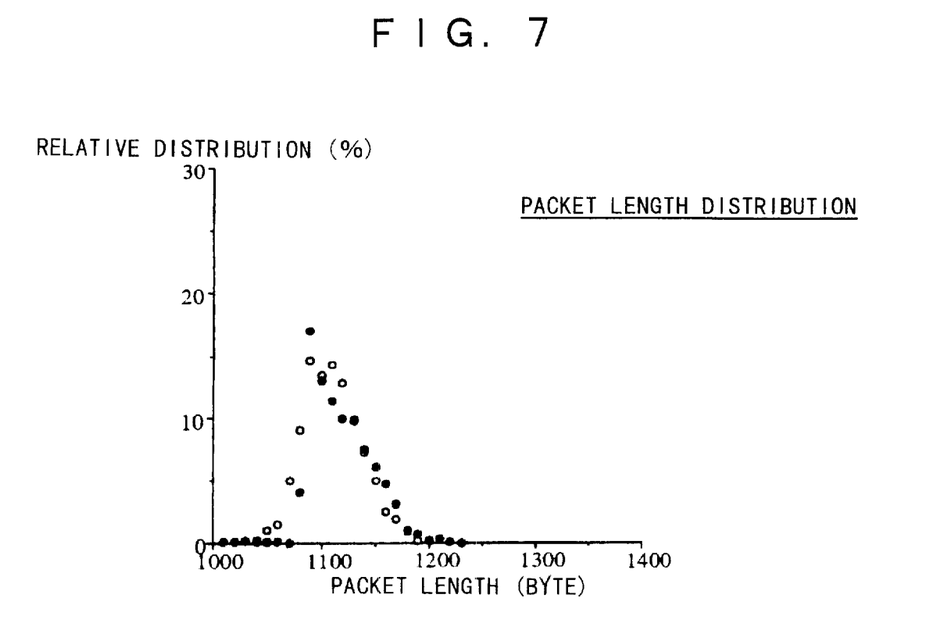
FIG. 7 is a diagram showing packet length distribution with respect to an actual traffic and a pseudo-traffic.
Figure 8:
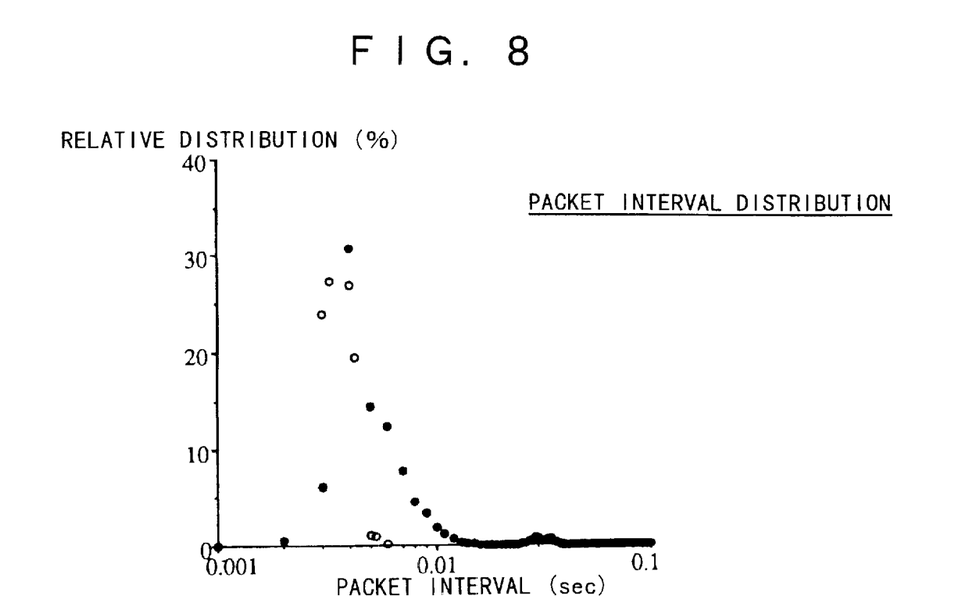
FIG. 8 is a diagram showing packet interval distribution with respect to an actual traffic and a pseudo-traffic.

FIG. 7 is a graphical representation showing, with respect to the packet length, the distribution of the actual traffics (indicated by black circles) and the pseudo-traffics (indicated by open circles) which are obtained on the basis of the mathematical models, and FIG. 8 is a graphical representation showing, with respect to the packet interval, the distribution of the actual traffics (indicated by black circles) and the pseudo-traffics (indicated by open circles) which are obtained on the basis of the mathematical models. As apparent from FIGS. 7 and 8, there are generated in both of the cases the highly accurate pseudo-traffics which are close in characteristics to the actual traffics.

As set forth hereinabove, according to the present invention, there can be provided the following effects.

(1) According to a traffic generator of the present invention, since both of a packet length and a packet interval of a pseudo-traffic can be arbitrarily set, it is possible to send the pseudo-traffic corresponding to an application as an object of evaluation.

(2) According to a method of determining a traffic generating function of the present invention, since a highly accurate mathematical model can be obtained which is capable of reproducing with accuracy both of a packet length and a packet interval of an actual traffic, it is possible to generate the pseudo-traffic which is close to the actual traffic.

What is claimed is:

1. A traffic generator for sending a pseudo-traffic to a packet-switched network to evaluate the network performance, comprising:

packet length determining means for determining dynamically a packet length of the pseudo-traffic;

packet interval determining means for determining dynamically a packet interval of the pseudo-traffic; and pseudo-traffic sending means for generating the pseudo-traffic having both of the packet length and the packet interval, which have been determined, to send the pseudo-traffic thus generated onto said network.

2. A traffic generator according to claim 1, wherein said packet length determining means determines the packet length on the basis of an approximate function of the packet length distribution.

3. A traffic generator according to claim 1, wherein said packet interval determining means determines the packet interval on the basis of an approximate function of the packet interval distribution.

4. A traffic generator for sending a pseudo-traffic to a packet-switched network to evaluate the network performance, comprising:

first storage means for storing therein at least one first mathematical model relating to the packet length distribution of a pseudo-traffic;

second storage means for storing therein at least one second mathematical model relating to the packet interval distribution of a pseudo-traffic;

first optimization means for optimizing parameters of the first mathematical model on the basis of the result of evaluation of a packet length generated on the basis of the first mathematical model with respect a packet length of an actual traffic;

second optimization means for optimizing parameters of the second mathematical model on the basis of the result of evaluation of a packet interval generated on the basis of the second mathematical model with respect a packet interval of an actual traffic; and pseudo-traffic sending means for sending the pseudo-traffic having both of the packet length and the packet interval, which have been generated on the basis of the optimized first mathematical model and the optimized second mathematical model, respectively, onto said network.

5. A traffic generator according to claim 4, further comprising:

first selection means for selecting successively the first mathematical models each as an adoption candidate from the plurality of first mathematical models stored in said first storage means;

a first mathematical model determining unit for determining an adoption model on the basis of the adaptation errors between the first mathematical models each as an adoption candidate, which have been successively optimized by said first optimization means, and the actual traffic;

second selection means for selecting successively the second mathematical models each as an adoption candidate from the plurality of second mathematical models stored in said second storage means; and a second mathematical model determining unit for determining an adoption model on the basis of the adaptation errors between the second mathematical models each as an adoption candidate, which have been successively optimized by said second optimization means, and the actual traffic, wherein said pseudo-traffic sending means sends the pseudo-traffic having both of the packet length and the packet interval which have been respectively generated on the basis of the mathematical models which have been adopted as the first and second mathematical models onto said network.

6. A traffic generating function determining method of optimizing parameters of mathematical models for a pseudo-traffic which is to be sent onto a network as an object of evaluation, said method comprising the steps of:

comparing the calculation results of first mathematical models used to define a packet length of a pseudo-traffic with a packet length of an actual traffic generated by an application as an object of evaluation to optimize parameters of the first mathematical models on the basis of the comparison result;

comparing the calculation results of second mathematical models used to define a packet interval of a pseudo-traffic with a packet interval of an actual traffic generated by an application as an object of evaluation to optimize parameters of the second mathematical models on the basis of the comparison result; and determining both of the packet length and the packet interval of the pseudo-traffic on the basis of the first and second mathematical models which have been optimized in parameters, respectively.

* * * * *